UNITED STATES PATENT OFFICE.

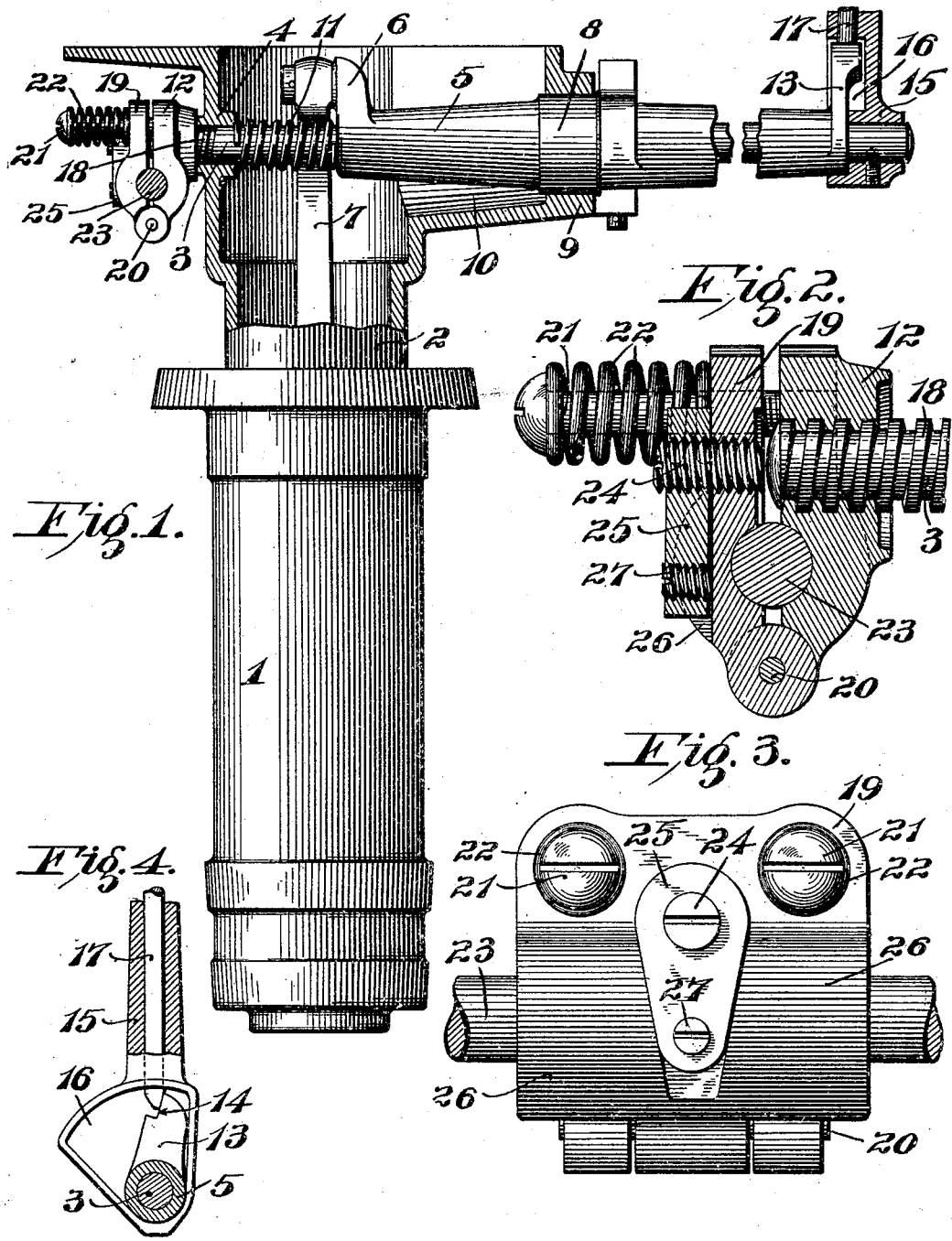

ERNEST E. KOKEN, OF ST. LOUIS, MISSOURI; WALTER F. KOKEN EXECUTOR OF ERNEST E. KOKEN, DECEASED.

CLAMP.

954,524.  Specification of Letters Patent.  Patented Apr. 12, 1910.

Application filed February 19, 1909. Serial No. 478,798.

*To all whom it may concern:*

Be it known that I, ERNEST E. KOKEN, a citizen of the United States, and a resident of the city of St. Louis and State of Missouri, have invented a new and useful Improvement in Clamps, of which the following is a specification.

My invention relates to a clamp or friction clutch and has for its principal object to make the clutch members adjustable for wear.

It consists in the construction and arrangements of parts hereinafter described and claimed.

In the accompanying drawing, which forms part of this specification, and wherein like symbols refer to like parts wherever they occur, Figure 1 is a vertical view partly in elevation and partly in section of the pump mechanism of a hydraulic chair embodying my invention; Fig. 2 is an enlarged vertical sectional view of a clamp embodying my invention; Fig. 3 is an elevation of the outer face of the clamp illustrated in Fig. 2; and, Fig. 4 is a detail view illustrating a device for locking the sleeve in engagement with the shaft-actuating hand lever.

The construction illustrated in the accompanying drawing comprises a cylinder 1, a hollow piston 2 adapted to reciprocate in said cylinder and a pump mechanism adapted to effect the admission and release of oil or other fluid between the end of the cylinder and the piston and thereby regulate the longitudinal position of the piston with respect to the cylinder. This type of mechanism is fully described in Letters Patent No. 548,258 granted to me October 22, 1895, to which reference is hereby made to supplement the present description.

Extending transversely through the upper end of the piston is a shaft 3, one end of which is journaled in a boss or other suitable bearing 4 provided therefor on the wall of the piston. Swiveled or journaled on this shaft is an elongated sleeve 5 whose inner end is provided with a crank arm 6 to which is pivotally connected the pitman or connecting rod 7 of the pump. This sleeve has an enlarged cylindrical portion 8 which is concentric with the shaft and is journaled in a suitable bearing 9 provided therefor in fixed relation to the piston. As illustrated in the accompanying drawing, this bearing is provided in a laterally extending bracket or hollow extension 10 integral with the upper end of the piston. An annular rib or shoulder formed on said sleeve at the end of its cylindrical portion serves as a means of preventing inward longitudinal movement of the sleeve.

Surrounding the portion of the shaft inside of the piston is a helical spring 11, one end of which bears against the inner side of the piston while the other end thereof bears against the end of the sleeve. The outward longitudinal movement of the shaft is limited by a threaded engagement with a clamping jaw 12 hereinafter mentioned. The outer end of the sleeve is provided with a laterally extending arm 13 provided with a notch 14 in its periphery; and the outer end of the shaft has a crank handle or hand-lever 15 secured thereto. The inner portion of this lever has an arcuate recess 16 in its face adapted to receive the lateral extension on the end of the sleeve. This crank handle or lever is also provided with a longitudinally reciprocatable bar or pin 17 adapted to engage and interlock with the notch 14 in the periphery of the lateral arm of said sleeve. When said pin engages said notch, the shaft is locked to the sleeve so that they move together. When, however, the locking pin is retracted out of engagement with said notch, the shaft is free to move without effecting any movement on the part of the sleeve. All of the mechanism above described is similar to the mechanism described in said Patent No. 548,258. The inner end of said shaft has a screw thread 18 thereon, upon which is mounted a threaded block 12 whose back or rear side is adapted to abut against a fixed portion of the piston. This block constitutes one member or jaw of a clamp, and its mate or counterpart 19 is pivotally connected thereto, preferably by means of a pintle 20 extending through alined perforations in the lower portions of the respective jaws. The outer member or jaw of the clamp or clutch has transverse holes through its upper portion, and extending through these holes are elongated headed bolts or screws 21, which are mounted in threaded holes provided therefor in the upper portion of the inner or fixed member. Surrounding the outer portion of each of these headed bolts or screws is a coiled spring 22, one end of which bears against the head of the bolt and the other end of which bears against the outer clamping jaw, whereby said springs tend to clamp or close said jaws together. The inner faces of the respective clamping jaws are provided with counterpart transverse grooves adapted to engage or grip the locking bar 23.

The end of the shaft is rounded, and the portion of the outer jaw or clamping member opposite the end of the shaft is provided with a bearing or abutment piece adapted to coöperate with the end of said shaft. Preferably, this abutment piece is made in the form of a hardened screw 24 mounted in a threaded opening provided therefor in the outer jaw in alinement with the shaft. By this arrangement, any wear on the end of the shaft or on the locking bar or on the faces of the clamping jaws may readily be compensated for by suitably adjusting this bearing piece. In order to prevent the bearing piece from losing its proper adjustment, the outwardly projecting portion of the screw has a threaded block or nut 25 mounted thereon. Preferably, this block or nut is elongated and has a screw-threaded hole in the outer end portion thereof. This block or nut or the outer end portion thereof lies in a recess between lugs or shoulders 26 provided therefor on the outer face of the clamping jaw to prevent the turning of said nut. In the screw threaded hole is mounted a blunt-pointed screw 27. By screwing this screw firmly against the face of the outer jaw, the block or nut is canted to a limited extent so that the threads thereof will bind strongly against the threads of the adjusting screw and thereby firmly lock the adjusting screw in position.

The operation of the device is as follows: In the normal position of the parts, the shaft is in its retracted or innermost position and the movable jaw is firmly pressed by the springs toward the fixed jaw, thereby firmly gripping the locking bar between the two jaws of the clamp. When the hand lever is turned to rotate the shaft, the threaded engagement of the shaft causes a longitudinal movement thereof; and this longitudinal movement of the shaft causes its end to bear against the abutment on the movable member or jaw and force such jaw outwardly. This movement effects the separation of the jaws and the release of the locking bar therefrom. Likewise the return of the shaft to its original position permits the springs to press the jaws toward each other and thereby clamp the locking bar. When the sleeve is properly locked to the shaft, the oscillation of the hand lever effects the actuation of the pump, as fully described in said Letters Patent No. 548,258.

Obviously, the clamp hereinbefore described is capable of use in other relations as well as in connection with the pump mechanism and locking bar of a hydraulic chair.

What I claim is:

1. A clamp comprising a pair of relatively movable jaws, automatic means tending to close said jaws, a movable member adapted to spread said jaws and an abutment piece for said member adjustably mounted on one of said jaws.

2. A clamp comprising a pair of relatively movable jaws, automatic means tending to close said jaws, a transversely movable member for opening said jaws and a screw adjustably mounted on the movable jaw opposite said movable member.

3. A clamp comprising a pair of relatively movable jaws, automatic means tending to close said jaws, a transversely reciprocatable member for separating said jaws, a screw adjustably mounted on the movable jaw opposite said reciprocatable member and constituting an abutment therefor, and a device for locking said screw against rotation.

4. A clamp comprising a pair of relatively movable jaws, automatic means tending to close said jaws, a transversely reciprocatable member for separating said jaws, a screw adjustably mounted on the movable jaw opposite said reciprocatable member and constituting an abutment therefor, and a device for locking said screw against rotation, said device comprising an elongated threaded nut mounted on said abutment screw and a second screw mounted in a threaded hole in the end portion of said nut in position to bear against said movable jaw.

5. A clamp comprising a pair of relatively movable jaws, automatic means tending to close said jaws, a transverse reciprocatable member, a screw adjustably mounted on the movable jaw opposite said reciprocatable member and constituting an abutment therefor, a nut mounted on said screw, a second screw mounted in a threaded hole in said nut in position to bear against said movable jaw, and shoulders on said movable jaw on opposite sides of said nut in position to prevent the turning thereof.

6. A clamp comprising a pair of relatively movable jaws, one of which is provided with a transverse threaded hole, a shaft having a thread engaging said hole and means for actuating said shaft to separate said jaws, an abutment piece adjustably mounted on the second jaw opposite the end of said shaft, and springs tending to press said jaws together.

7. A clamp comprising a pair of relatively movable jaws, one of which is provided with a transverse threaded hole, a shaft having a thread engaging said hole and means for actuating said shaft to separate said jaws, a screw mounted on the second jaw opposite the end of said shaft and constituting an adjustable abutment therefor, and springs tending to press said jaws together.

8. A clamp comprising a pair of relatively movable jaws, springs tending to press said jaws together, one of said jaws having a transverse threaded hole, a shaft having a thread engaging said hole, and means for actuating said shaft to separate said jaws, a screw mounted on the second jaw opposite the end of said shaft, a nut mounted on said screw, and a second screw mounted in a threaded hole in said nut in position to bear against said second jaw, and means for preventing the turning of said nut.

9. A clamp comprising a pair of relatively movable jaws pivotally connected together, one of said jaws being provided with a transverse threaded hole, a shaft having a thread engaging said hole and means for actuating said shaft to separate said jaws, an abutment piece adjustably mounted on the second jaw opposite the end of said shaft, and springs tending to press said jaws together.

10. A clamp comprising a pair of relatively movable jaws pivotally connected together and springs tending to press said jaws together, one of said jaws being provided with a transverse threaded hole, and the other jaw being provided with an adjustable abutment opposite said hole, a shaft having a thread engaging said hole and arranged to bear against said abutment piece, a handle for actuating said shaft, and a sleeve journaled on said shaft, said sleeve being detachably operatively connected to said handle and being provided with a crank arm adapted to transmit a rotary movement of said shaft.

11. A clamp comprising a pair of relatively movable jaws, one of which has a movable abutment piece adjustably mounted thereon, and a transversely movable member adapted to bear against said abutment piece to move the jaw upon which it is mounted.

12. A clamp comprising a pair of relatively movable jaws, one of which has an adjustable screw mounted transversely thereof and a member adapted to bear against said screw to move the jaw upon which said screw is mounted.

ERNEST E. KOKEN.

Witnesses:
JAMES A. CARR,
J. B. MEGOWN.